(12) United States Patent
Ishii (10) Patent No.: US 10,277,855 B2
(45) Date of Patent: Apr. 30, 2019

(54) IMAGE SENSING DEVICE AND CONTROL METHOD THEREOF WITH SWITCHABLE ANALOG-TO-DIGITAL CONVERSION MODES BASED ON THE AMOUNT OF DARK CURRENT GENERATED IN PIXELS

(71) Applicant: CANON KABUSHIKI KAISHA, Tokyo (JP)

(72) Inventor: Mie Ishii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/653,628

(22) Filed: Jul. 19, 2017

(65) Prior Publication Data

US 2018/0027202 A1 Jan. 25, 2018

(30) Foreign Application Priority Data

Jul. 20, 2016 (JP) ................... 2016-142725

(51) Int. Cl.
*H04N 5/378* (2011.01)
*H04N 5/361* (2011.01)
*H04N 5/30* (2006.01)
*H04N 3/14* (2006.01)
*H04N 5/3745* (2011.01)

(52) U.S. Cl.
CPC ........... *H04N 5/378* (2013.01); *H04N 3/1556* (2013.01); *H04N 5/30* (2013.01); *H04N 5/361* (2013.01); *H04N 3/1562* (2013.01); *H04N 5/37455* (2013.01)

(58) Field of Classification Search
CPC ........ H03M 1/56; H03M 1/186; H03M 1/187; G06T 2207/20208; G06T 2207/1014; H04N 5/378; H04N 5/361; H04N 3/1556; H04N 5/30; H04N 3/1562; H04N 5/37455
USPC .......................................... 348/308
See application file for complete search history.

(56) References Cited

U.S. PATENT DOCUMENTS

| 2009/0002527 | A1* | 1/2009 | Higuchi | H03M 1/0604 |
| | | | | 348/243 |
| 2015/0244388 | A1* | 8/2015 | Hashimoto | H03M 1/34 |
| | | | | 348/322 |
| 2016/0173794 | A1* | 6/2016 | Beck | H04N 5/361 |
| | | | | 348/244 |
| 2016/0212365 | A1* | 7/2016 | Kato | H04N 5/378 |

(Continued)

FOREIGN PATENT DOCUMENTS

| JP | 2005-278135 A | 10/2005 |
| JP | 2013-009087 A | 1/2013 |

*Primary Examiner* — Lin Ye
*Assistant Examiner* — Chan T Nguyen
(74) *Attorney, Agent, or Firm* — Cowan, Liebowitz & Latman, P.C.

(57) ABSTRACT

An image sensing device includes: a plurality of pixels; and an AD converter that compares a pixel signal output from the plurality of pixels with a slope voltage having a temporally variable potential so as to perform AD conversion on the pixel signal, and switching is performed between a first mode and a second mode according to an imaging condition, the first mode being a mode in which the pixel signal is AD converted by selecting one from among a plurality of slope voltages and comparing the pixel signal with the selected slope voltage, and the second mode being a mode in which the pixel signal is AD converted by comparing the pixel signal with a predetermined slope voltage.

12 Claims, 9 Drawing Sheets

(56) References Cited

U.S. PATENT DOCUMENTS

| | | | | |
|---|---|---|---|---|
| 2017/0064237 A1* | 3/2017 | Aibara | ............... | H04N 5/2357 |
| 2017/0201693 A1* | 7/2017 | Sugizaki | ............... | H04N 5/355 |
| 2018/0084211 A1* | 3/2018 | Nishino | ............... | H04N 5/357 |

* cited by examiner

| ISO3200 | | EXPOSURE TIME[s] | | | |
|---|---|---|---|---|---|
| | | LESS THAN 1 SECOND | 1 SECOND OR MORE AND LESS THAN 8 SECONDS | 8 SECONDS OR MORE AND LESS THAN 64 SECONDS | 64 SECONDS OR MORE |
| TEMPERATURE AT IMAGE CAPTURE TIME[°C] | LESS THAN 0°C | MODE 1 | MODE 1 | MODE 1 | MODE 1 |
| | 0°C OR MORE AND LESS THAN 20°C | MODE 1 | MODE 1 | MODE 1 | MODE 1 |
| | 20°C OR MORE AND LESS THAN 40°C | MODE 1 | MODE 1 | MODE 1 | MODE 2 |
| | 40°C OR MORE AND LESS THAN 60°C | MODE 1 | MODE 1 | MODE 2 | MODE 2 |
| | 60°C OR MORE | MODE 1 | MODE 2 | MODE 2 | MODE 2 |

FIG. 8

FIG. 9

IMAGE SENSING DEVICE AND CONTROL METHOD THEREOF WITH SWITCHABLE ANALOG-TO-DIGITAL CONVERSION MODES BASED ON THE AMOUNT OF DARK CURRENT GENERATED IN PIXELS

BACKGROUND OF THE INVENTION

Field of the Invention

The present invention relates to an image sensing device, and a control method thereof.

Description of the Related Art

In recent years, advancement has been made in functionality and versatility of image sensing devices that use a CMOS image sensor and the like in order to cater to various types of needs. Along with an increase in the number of pixels and the speed of imaging, there is a growing need for a type of CMOS image sensor that can read out pixel signals at a higher speed. In order to achieve high speed readout, a method is widely used in recent years in which an analog-to-digital conversion circuit (hereinafter referred to as a column ADC) is disposed for each column so as to provide a digital output (Japanese Patent Laid-Open No. 2005-278135). The use of column ADCs allows the image sensor to digitally transmit pixel signals to the outside, and with an improvement in the digital signal transmission technique, high speed readout has become possible.

In Japanese Patent Laid-Open No. 2005-278135, a single slope method is used as a column AD conversion method. The single slope method is a method that uses a comparator and a counter and in which while an analog pixel signal is input into one of the input terminals of the comparator, a slope voltage is input into the other input terminal as a reference signal, the slope voltage being a voltage that varies with inclination along with time. The output of the comparator is inverted at the time at which the magnitude relationship between the pixel signal and the reference signal is inverted. The counter digitally counts up with time, and stops counting when the output of the comparator is inverted. The output of the counter when counting is stopped represents the digital value of the analog pixel signal. AD conversion is thereby performed. In the case of the single slope method, in order to achieve a high bit resolution signal output, the counting time of the counter increases. For example, in order to increase the resolution from 12 bits to 14 bits, a four times longer time is required as the AD conversion period if the counter has a constant operation clock.

Also, a technique is proposed in Japanese Patent Laid-Open No. 2013-9087 that enables higher speed readout by switching between a low bit resolution ADC and a high bit resolution ADC according to the signal output. Considering light shot noise characteristics of pixel signals, because a large amplitude signal only needs to have a resolution enough to ensure a SN ratio, in the case where the select circuit included in the ADC performs AD conversion on a large amplitude signal, a slope voltage having a large inclination is selected to perform low bit resolution AD conversion. On the other hand, in the case of AD conversion of a small amplitude signal, a slope voltage having a small inclination is selected to perform high bit resolution AD conversion. By doing so, the time required to perform AD conversion of a large amplitude signal, which takes a long time in conventional AD conversion, can be shortened although the AD conversion is low bit resolution AD conversion.

It is known that a dark current is generated in an image sensor when exposure is performed for a long period of time or when image capturing is performed under a high temperature environment. The dark current is proportional to exposure time, and therefore under an imaging condition in which exposure is performed for a long period of time, the output caused by a dark current increases, and its influence cannot be ignored. The dark current is detrimental to image quality, and thus processing is performed to subtract a dark current component from an optical signal component, but the processing is usually performed after the output has been digitalized.

In the case of the method as disclosed in Japanese Patent Laid-Open No. 2013-9087 in which low bit resolution AD conversion is performed when AD conversion is performed on a large amplitude signal, image quality is deteriorated under an imaging condition in which the dark current is large. This is because the amplitude increases due to the dark current even when the actual optical signal has a small amplitude, and the optical signal having a small amplitude is AD converted with a low bit resolution.

SUMMARY OF THE INVENTION

The present invention has been made in view of the problems described above, and it is an object of the present invention to provide an image sensing device that can perform AD conversion while achieving both a high level of image quality and high speed readout.

According to a first aspect of the present invention, there is provided an image sensing device comprising: a plurality of pixels; and an AD converter that compares a pixel signal output from the plurality of pixels with a slope voltage having a temporally variable potential so as to perform AD conversion on the pixel signal, wherein switching is performed between a first mode and a second mode according to an imaging condition, the first mode being a mode in which the pixel signal is AD converted by selecting one from among a plurality of slope voltages and comparing the pixel signal with the selected slope voltage, and the second mode being a mode in which the pixel signal is AD converted by comparing the pixel signal with a predetermined slope voltage.

According to a second aspect of the present invention, there is provided a method for controlling an image sensing device including a plurality of pixels, the method comprising: comparing a pixel signal output from the plurality of pixels with a slope voltage having a temporally variable potential so as to perform AD conversion on the pixel signal, wherein in the AD conversion step, switching is performed between a first mode and a second mode according to an imaging condition, the first mode being a mode in which the pixel signal is AD converted by selecting one from among a plurality of slope voltages and comparing the pixel signal with the selected slope voltage, and the second mode being a mode in which the pixel signal is AD converted by comparing the pixel signal with a predetermined slope voltage.

Further features of the present invention will become apparent from the following description of exemplary embodiments with reference to the attached drawings.

DESCRIPTION OF THE EMBODIMENTS

Hereinafter, embodiments according to the present invention will be described in detail with reference to the accompanying drawings.

First Embodiment

Figure 1:
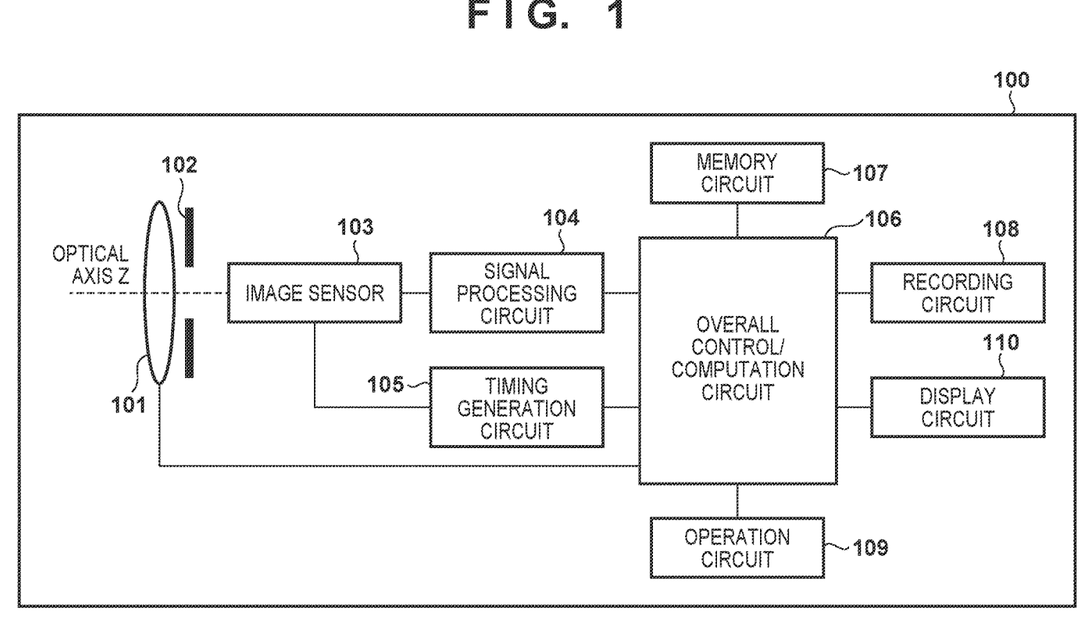
FIG. 1 is a block diagram showing a configuration of an image sensing device according to a first embodiment of the present invention.

FIG. 1 is a block diagram showing a configuration of an image sensing device 100 according to a first embodiment of the present invention. In FIG. 1, an imaging optical system of the image sensing device 100 includes an imaging lens 101 and a diaphragm 102. Light that has passed through the imaging lens 101 and the diaphragm 102 forms an image near a focal position of the imaging lens 101. The imaging lens 101 is illustrated as a single lens in the diagram, but in practice, the imaging lens 101 is composed of a plurality of lens groups. An image sensor 103 is a CMOS image sensor, and has a function of converting a subject image formed by the imaging lens 101 to an electric signal according to the amount of light and further converting the electric signal to an image signal that can be applied to data processing. A signal processing circuit 104 performs, on the image signal output from the image sensor 103, signal amplification, various types of corrections such as reference level adjustment, data sorting, and the like. A timing generation circuit 105 outputs a drive timing signal to the image sensor 103 and the signal processing circuit 104.

An overall control/computation circuit 106 performs overall drive and control of the entire image sensing device 100 including the image sensor 103, the signal processing circuit 104, and the like. Also, the overall control/computation circuit 106 performs, on the image signal output from the signal processing circuit 104, predetermined image processing and defect correction processing, and the like. A memory circuit 107 and a recording circuit 108 are recording media such as non-volatile memories or memory cards that record and store, for example, the image signal output from the overall control/computation circuit 106. An operation circuit 109 receives an input from an operation member provided in the image sensing device 100 and transmits a user instruction to the overall control/computation circuit 106. A display circuit 110 displays a captured image, a live view image, various types of settings screens, and the like.

Figure 2:
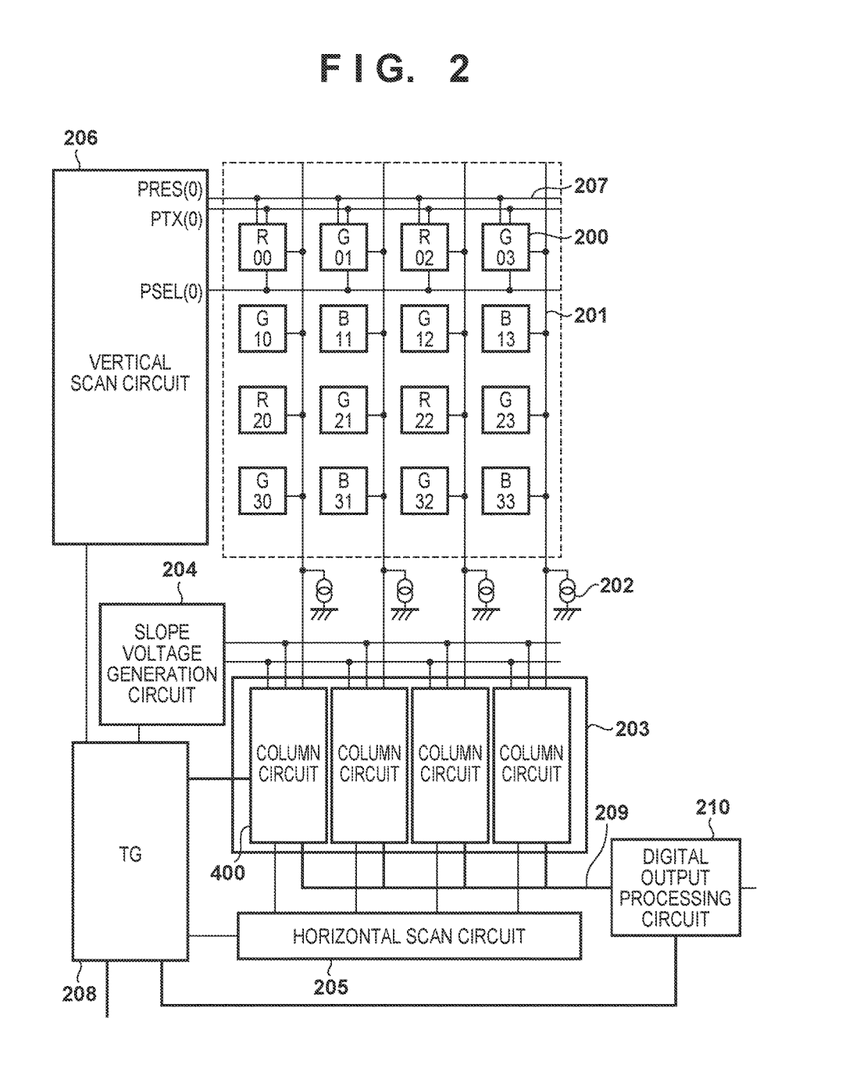
FIG. 2 is a diagram illustrating a configuration of an image sensor according to the first embodiment.

Next, a configuration of the image sensor 103 will be described with reference to FIGS. 2 to 4. FIG. 2 is a block diagram showing an example of a configuration of the image sensor 103 according to the present embodiment.

As shown in FIG. 2, in the image sensor 103, a plurality of unit pixels 200 are arranged in matrix. FIG. 2 shows a total of sixteen unit pixels 200 that are arranged in four rows and four columns, but in practice, the image sensor 103 is composed of several tens of millions of unit pixels 200 that are arranged in an array. The unit pixels 200 are provided with a Bayer array color filter composed of red (R), green (G), and blue (B) filters. In FIG. 2, a character and a number that are attached to each unit pixel 200 represent the pixel color and address of the unit pixel 200. For example, G01 represents the green (G) pixel in the zeroth row and the first column. Each unit pixel 200 outputs a pixel signal to a column output line 201, and each column output line 201 is connected to a current source 202.

A readout circuit 203 is composed of a plurality column circuits 400, and each column circuit 400 receives an input of pixel signals on the column output line 201, and performs analog-to-digital conversion (AD conversion). A slope voltage generation circuit 204 generates a slope voltage having a temporally variable potential that is used in AD conversion performed by each column circuit 400. The slope voltage generation circuit 204 generates a slope voltage whose potential varies at a constant rate of variation over time, and is capable of simultaneously generating a plurality of patterns of slope voltages having different inclinations. The slope voltage generation circuit 204 also generates a reference voltage VREF.

Through operation of a horizontal scan circuit 205, the signals AD converted by the column circuits 400 are sequentially output to the outside of the image sensor via horizontal output lines 209 and a digital output processing circuit 210. A vertical scan circuit 206 selects a row via one of signal lines 207 connected to each row and drives the selected row. In FIG. 2, only one signal line 207 is illustrated for the zeroth row, but in practice, the signal lines 207 are provided for each row.

Figure 3:
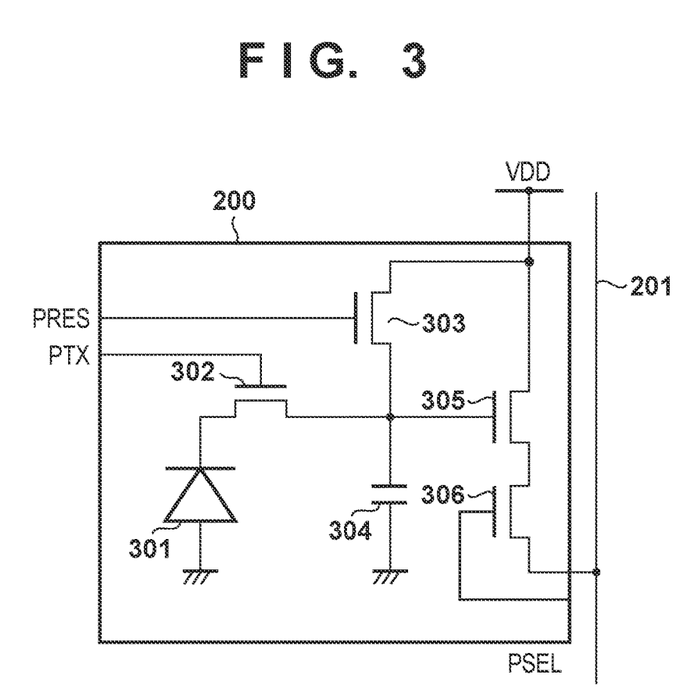
FIG. 3 is a diagram illustrating a pixel circuit included in the image sensor.
Figure 4:
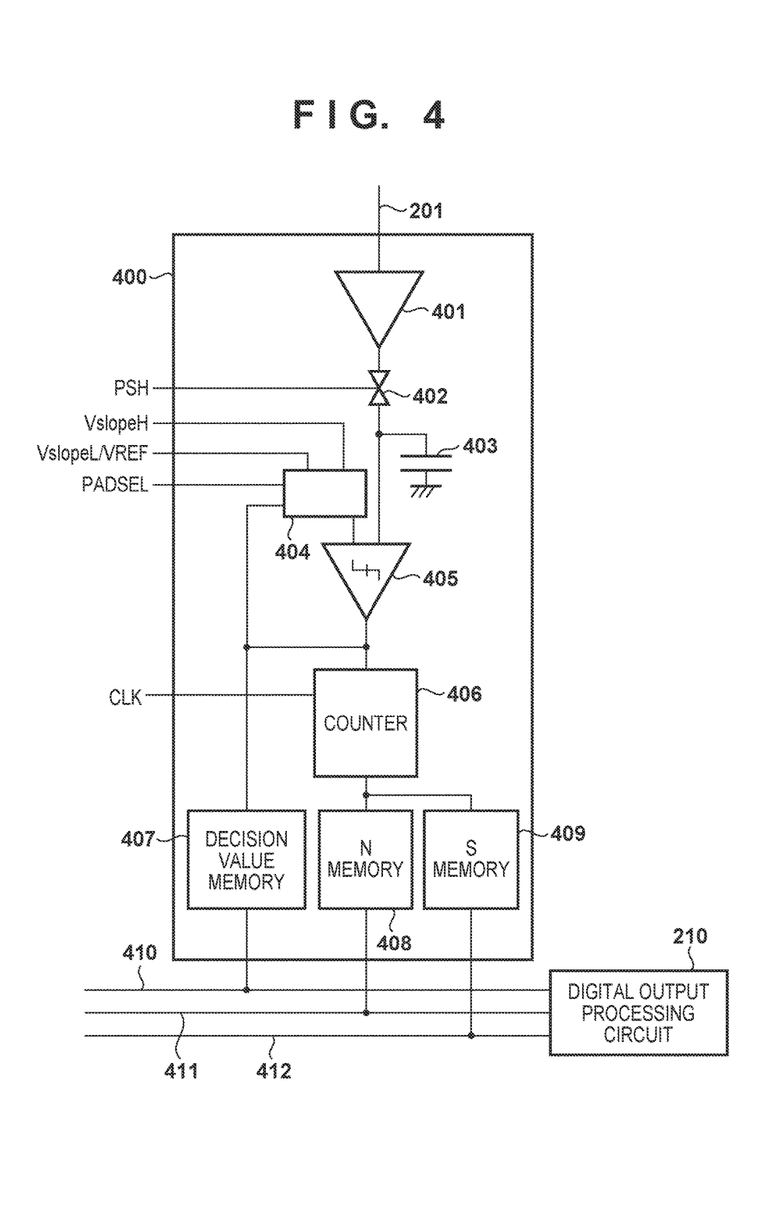
FIG. 4 is a diagram illustrating a column circuit included in the image sensor.

FIG. 3 is a diagram showing an example of a circuit configuration of a unit pixel 200 included in the image sensor 103 according to the present embodiment. In the unit pixel 200, a photo diode (hereinafter referred to as PD) 301 (photoelectric conversion portion) generates electric charges upon receiving a subject image formed by the imaging lens 101, and stores the generated electric charges. The electric charges stored in the PD 301 are transferred to a floating diffusion portion (hereinafter referred to as FD) 304 via a transfer MOS transistor (transfer switch) 302. When a select switch 306 is turned on, the electric charges transferred to the FD 304 are output to the column output line 201 via an amplifying MOS transistor (hereinafter referred to as SF) 305 as a voltage corresponding to the electric charges, the amplifying MOS transistor 305 being a transistor that forms a source follower amplifier. The select switches 306 are controlled on a row-by-row basis, and the pixel signals of a selected row are collectively output to the column output lines 201 provided for each column. A reset MOS transistor (reset switch) 303 resets the potential of the FD 304, and also resets the potential of the PD 301 to VDD via the transfer switch 302. The transfer switch 302, the reset switch 303, and the select switch 306 are respectively controlled by control signals PTX, PRES, and PSEL via the signal line 207 connected to the vertical scan circuit 206.

Next, a column circuit 400 that constitutes the readout circuit 203 will be described. FIG. 4 is a diagram showing an example of a column circuit 400 included in the image sensor 103 according to the present embodiment. The readout circuit 203 is composed of a plurality of column circuits 400, and signals output through the column output lines 201 are input into the column circuits 400. An amplifier 401 amplifies the signal transmitted through the column output line 201, and a capacitor 403 is used to store a signal voltage. Writing to the capacitor 403 is controlled by a switch 402 that is turned on and off by a control signal PSH. One of two input terminals of a comparator 405 receives an input of the reference voltage VREF and the slope voltage serving as a fiducial voltage that are supplied from the slope voltage generation circuit 204 shown in FIG. 2 according to the result of selection made by a select circuit 404. The operations performed by the select circuit 404 will be described later in detail. The other input terminal of the comparator 405 receives an output of the amplifier 401 written into the capacitor 403. The comparator 405 compares the output of the amplifier 401 with the reference voltage VREF and the slope voltage serving as the fiducial voltage, and outputs one of two values corresponding to a low level and a high level according to the magnitude relationship. To be specific, the comparator 405 outputs the value corresponding to a low level if the voltage input from the select circuit 404 is smaller than the output of the amplifier 401, and outputs the value corresponding to a high level if the voltage input from the select circuit 404 is greater than the output of the amplifier 401. A clock (hereinafter referred to as CLK) starts running at the same time when the slope voltage serving as the fiducial voltage starts transitioning, and a counter 406 counts up according to the CLK when an output from the comparator 405 is at a high level, and stops counting at the same time when the output of the comparator 405 is inverted to a low level (when the magnitude relationship is reversed).

A decision value memory 407 stores therein the result of comparison between the reference voltage VREF and the output from the amplifier 401 performed by the comparator 405. Then, an N memory 408 stores therein, for example, a digital signal obtained through AD conversion of a reset level signal (hereinafter referred to as "N signal") of the FD 304. An S memory 409 stores therein a digital signal obtained through AD conversion of a signal (hereinafter referred to as "S signal") in which the signal of the PD 301 is superimposed on the N signal of the FD 304. The signals stored in the decision value memory 407, the N memory 408, and the S memory 409 will be described later in detail.

The signals stored in the decision value memory 407, the N memory 408, and the S memory 409 are output to the digital output processing circuit 210 via horizontal output lines 410, 411 and 412 in response to a control signal from the horizontal scan circuit 205. Then, the digital output processing circuit 210 subtracts the N signal from the S signal, and outputs a signal from which a reset noise component of the FD 304 that can cause noise has been removed. Processing performed by the digital output processing circuit 210 will be described later.

Figure 5:
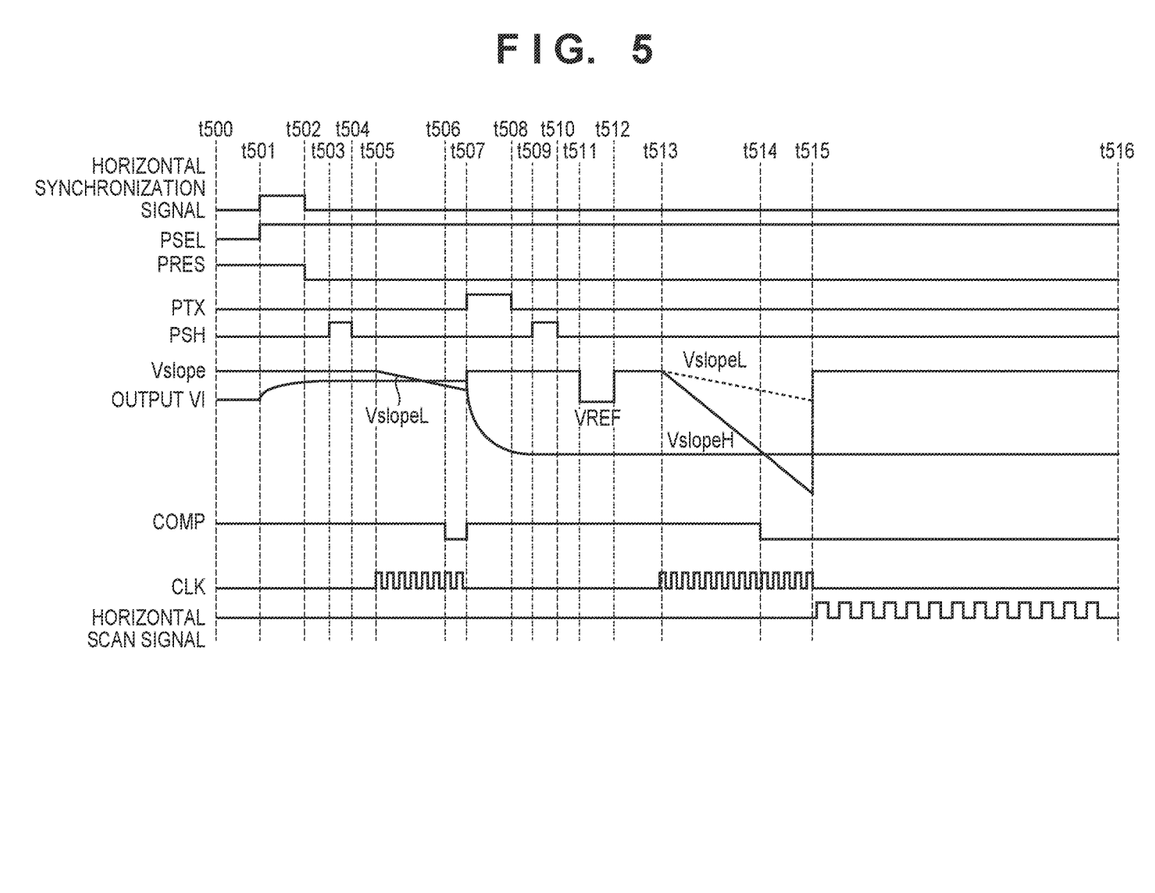
FIG. 5 is a timing chart showing an example of operations performed in a first AD conversion mode.
Figure 6:
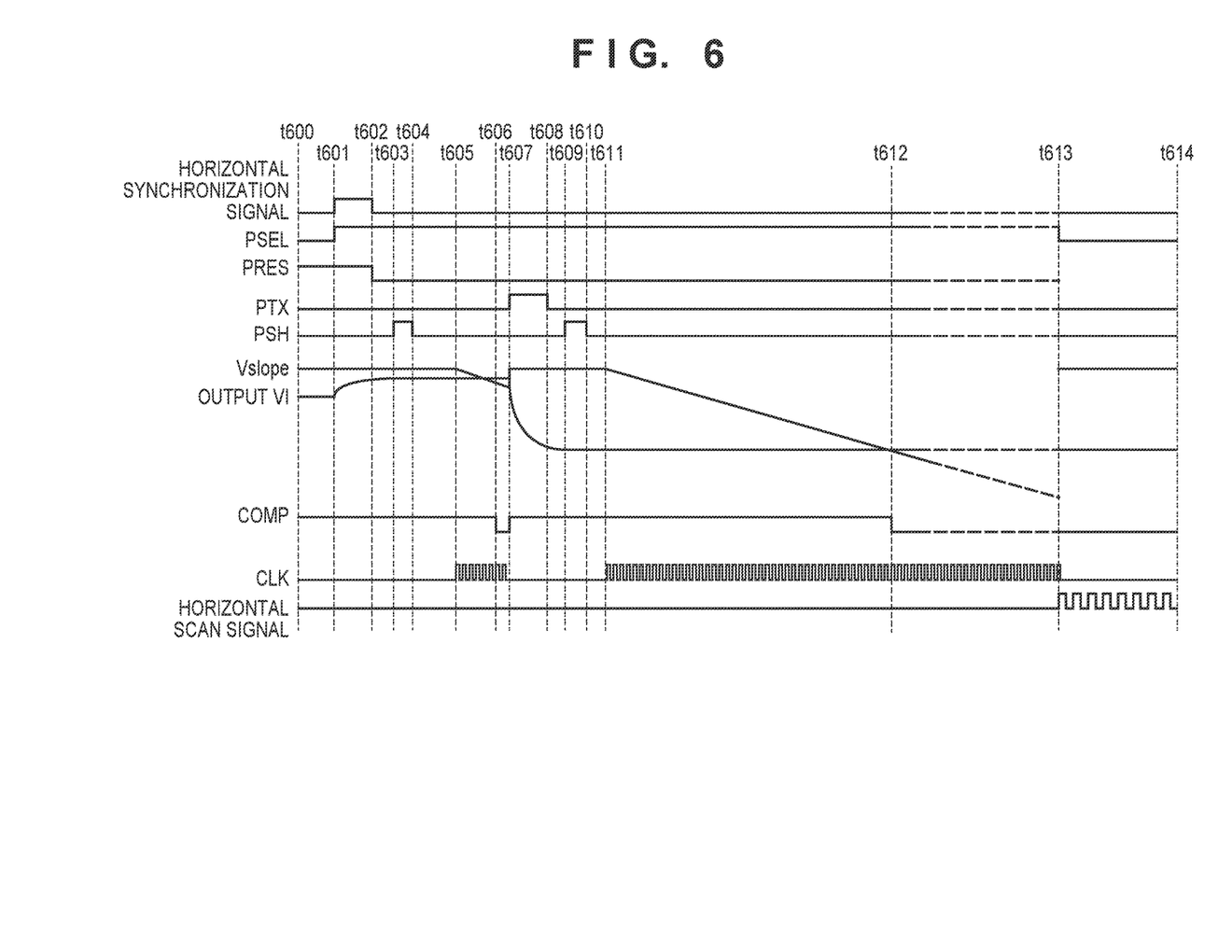
FIG. 6 is a timing chart showing an example of operations performed in a second AD conversion mode.

Next, an electric charge readout operation of reading out electric charges from the unit pixels 200 in one row of the image sensor 103 will be described. The image sensor 103 according to the present embodiment has two AD conversion modes. One of the modes is a multi-slope AD conversion mode (first AD conversion mode) in which AD conversion is performed by selecting a slope voltage from among a plurality of types of slope voltages according to the signal output level. The other mode is a single slope AD conversion mode (second AD conversion mode) in which AD conversion is performed by using a single slope voltage irrespective of the signal output level. FIGS. 5 and 6 are timing charts showing examples of electric charge readout operations in the AD conversion modes. Timings of drive pulses, slope voltage Vslope (including the reference voltage VREF), CLK, and horizontal scan signal are schematically shown. Potential V1 that is output from the amplifier 401 at each timing is also shown. COMP indicates the output level of the comparator 405.

FIG. 5 is a timing chart showing an example of an electric charge readout operation in the multi-slope AD conversion mode (first AD conversion mode). Prior to the readout of a signal from the PD 301, a control signal PRES of the reset switch 303 is set to High (t500). In response thereto, the gate of the SF 305 is reset to a reset power supply voltage. At time t501, a control signal PSEL is set to High so as to bring the SF 305 into an operation state. Then, at time t502, the control signal PRES is set to Low so as to remove the reset of the FD 304. The potential of the FD at this time is read out into the column output line 201 as a reset signal level (N signal), and then input into the column circuit 400 constituting the readout circuit 203. A control signal PSH is set to High at time t503 and set to Low at time t504 so as to turn on and off the switch 402, and through this, the N signal read out into the column output line 201 is amplified with a desired gain by the amplifier 401 and thereafter stored in the capacitor 403. The N signal stored in the capacitor 403 is input into one of the input terminals of the comparator 405.

After the switch 402 has been turned off at time t504, during a period from time t505 to time t507, the slope voltage generation circuit 204 causes a slope voltage VslopeL to decrease from its initial value along with time. The slope voltage generation circuit 204 is capable of simultaneously generating a plurality of slope voltages having different inclinations, namely, a slope voltage VslopeH having a large inclination and a slope voltage VslopeL having a small inclination, and inputting the generated slope voltages into the column circuit 400. However, in this example, only the slope voltage VslopeL is generated and input into the comparators 405 via the select circuits 404 of the column circuit 400. With the use of the slope voltage VslopeL as the fiducial voltage, it is possible to perform higher resolution AD conversion on a signal amplitude than when the slope voltage VslopeH is used. These driving operations are implemented by transmitting a control signal from a TG 208 to the slope voltage generation circuit 204 and the select circuits 404 of the column circuits 400.

Simultaneously with the start of transition of the slope voltage VslopeL at time t505, a CLK is supplied to the counter 406. The value of the counter 406 increases according to the number of CLKs. Then, when the slope voltage VslopeL input into the comparator 405 reaches the same level as the N signal (time t506), the output COMP of the comparator 405 is set to a low level, and at the same time, the operation of the counter 406 stops. The count value obtained when the operation of the counter 406 stopped is a value corresponding to the AD converted N signal, and stored in the N memory 408.

Next, after the digitalized N signal has been stored in the N memory 408, a control signal PTX is set to High at time t507 and then set to Low at time t508 so as to transfer the photoelectric charges stored in the PD 301 to the FD 304. Then, a variation in the potential of the FD 304 corresponding to the amount of electric charges is read out into the column output line 201 as an S signal level (optical component+reset noise component (N signal)), and then input into the column circuit 400. After the S signal has been amplified with a desired gain by the amplifier 401, the control signal PSH is set to High at time t509 and then set to Low at time t510 so as to turn on and off the switch 402, and thereby stored in the capacitor 403. The potential stored in the capacitor 403 is input into one of the input terminals of the comparator 405. After the switch 402 has been turned off at time t510, during a period from time t511 to time t512, the reference voltage VREF is input into the other input terminal of the comparator 405. The reference voltage VREF is generated by the slope voltage generation circuit 204, and input into the comparator 405 via the select circuit 404 of the column circuit 400.

Next, during a period from time t513 to time t515, the slope voltage generation circuit 204 causes the slope voltage VslopeL and the slope voltage VslopeH to decrease from the initial value along with time. Which of the slope voltages VslopeH and VslopeL is input into the comparator 405 by each column circuit 400 is determined according to the value of the output COMP of the comparator 405 during the period from time t511 to time t512.

In the case of FIG. 5, when the level of the output V1 and the level of the reference voltage VREF (reference value) are compared, the reference voltage VREF is greater than the output V1 (reference voltage VREF>output V1), and thus the output COMP is set to a high level (=1). The level of the output COMP is also input into the select circuit 404, and in the case where the output COMP is 1, the slope voltage VslopeH having a relatively large inclination is selected and input into the comparator 405. On the other hand, in the case where the output V1 is less than or equal to the reference voltage VREF (less than or equal to the reference value), or in other words, in the case where the output COMP is 0, the slope voltage VslopeL having a relatively small inclination is selected. Here, the value of the output COMP during the period from time t511 to time t512 is defined as decision value J, and the decision value J is input into the select circuit 404 and at the same time also stored in the decision value memory 407. Although not shown in FIG. 4, a switch may be provided so as to perform control such that the output of the comparator 405 is input into the select circuit 404 and the decision value memory 407 only during the period from time t511 to time t512.

Simultaneously with the start of transition of the slope voltage VslopeH, a CLK is supplied to the counter 406. The value of the counter 406 increases according to the number of CLKs. Then, when the fiducial voltage VslopeH input into the comparator 405 reaches the same level as the S signal, the output COMP of the comparator 405 is set to a low level (time t514), and at the same time the operation of the counter 406 also stops. The count value obtained when the operation of the counter 406 stopped is a value corresponding to the AD converted S signal, and stored in the S memory 409 that is a memory for the S signal.

Next, the signals stored in the decision value memory 407, the N memory 408, and the S memory 409 are read out by the horizontal scan circuit 205. The column circuits 400 are sequentially operated from time t515, and the signals stored in the decision value memory 407, the N memory 408, and the S memory 409 are thereby transmitted to the digital output processing circuit 210 via the horizontal output lines 410, 411, and 412. Then, after computation processing has been performed, the signals are output to the outside of the image sensor 103.

The digital output processing circuit 210 calculates a differential signal level (optical component) obtained by subtracting the N signal from the S signal. Prior to the computation of subtraction: S signal-N signal, processing of correcting the result of AD conversion is performed by using the slope voltage selected at the time of AD conversion of the S signal.

Processing of correcting the result of AD conversion will now be described. For example, in the case where the inclination of the slope voltage VslopeH is four times larger than the inclination of the slope voltage VslopeL, the signal amplitude corresponding to one CLK, or in other words, one count of output is four times greater for VslopeH. Accordingly, in order to adjust the digital output to the potential level of the signal, processing is performed to increase the count value that has been AD converted with VslopeH by four times by using a digital gain. Whether or not it is necessary to perform correction processing on the S signal input into the digital output processing circuit 210 can be determined based on the decision value J stored in the decision value memory 407. That is, if the decision value J is 1, because it means that the slope voltage VslopeH is selected, processing of increasing the S signal by four times is performed, and if the decision value J is 0, because it means that the slope voltage VslopeL is selected, the processing of increasing the S signal by four times is not performed.

The level of the reference voltage VREF for determining the decision value J can be set to any level, but for example, in the case where the inclination of the slope voltage VslopeH is four times larger than the inclination of the slope voltage VslopeL, the reference voltage VREF is set to a level corresponding to one-fourth of the amplitude of the output signal that needs to be AD converted. For example, if the output signal that needs to be AD converted has an amplitude of 1 [V], the reference voltage VREF is set to a level corresponding to an amplitude of 0.25 [V]. In a configuration in which the counter at the time of AD conversion is 12 bits, and counting is performed up to 4095, control is performed such that the slope voltage VslopeL has an amplitude of 0.25 [V] at a count of 4095. Then, control is performed such that the slope voltage VslopeH has an amplitude of 1 [V] at a count of 4095. When AD conversion is performed with the above-described configuration, as the results of correction processing, in the case of a small amplitude of 0.25 [V] or less, that is, a low brightness output, output results are obtained for every count from 0 to 4095. In the case of a large amplitude of greater than 0.25 [V] and 1 [V] or less, that is, a high brightness output, output results are obtained for every four counts from 4096 to 16380. As described above, although the resolution of high brightness outputs is reduced as compared with that of low brightness outputs, AD conversion can be performed at a high speed without taking time for counting until a count corresponding to 14 bits is reached.

FIG. 6 is a timing chart showing an example of an electric charge readout operation in the single slope AD conversion mode (second AD conversion mode). The electric charge readout operation in the single slope AD conversion mode will be described with reference to FIG. 6. Operations performed from time t600 to time t610 are the same as those performed from time t500 to time t510 shown in FIG. 5, and thus a description thereof is omitted here.

At time t610, when the switch 402 is turned off, the slope voltage generation circuit 204 causes the slope voltage VslopeL (or VslopeH) to decrease from the initial value along with time during a period from time t611 to time t613. In the single slope AD conversion mode, AD conversion is performed by using a single slope fiducial voltage, and thus it is unnecessary to input the reference voltage VREF and perform a decision operation as in the multi-slope AD conversion mode. Also, the slope voltage generation circuit 204 generates only one type of slope voltage, and inputs the generated slope voltage into the column circuit 400. Here, the slope voltage VslopeL is input into one of the input terminals of the comparator 405 via the select circuit 404.

Simultaneously with the start of transition of the slope voltage VslopeL, a CLK is supplied to the counter 406. The value of the counter 406 increases according to the number of CLKs. Then, when the fiducial voltage VslopeL input into the comparator 405 reaches the same level as the S signal, the output COMP of the comparator 405 is set to a low level (time t612), and at the same time, the operation of the counter 406 also stops. The count value obtained when the operation of the counter 406 stopped is a value corresponding to the AD converted S signal, and stored in the S memory 409 that is a memory for the S signal.

Next, the signals stored in the N memory 408 and the S memory 409 are read out by the horizontal scan circuit 205. By sequentially causing the column circuits 400 to perform operation from time t613, the signals stored in the N memory 408 and the S memory 409 are transmitted to the digital output processing circuit 210 via the horizontal output lines 411 and 412. After processing such as calculation of a differential signal level (optical component) by subtracting the N signal from the S signal has been performed, the signals are output to the outside of the image sensor 103.

As described above, the image sensing device according to the present embodiment has the following two modes: the multi-slope AD conversion mode (first AD conversion mode); and the single slope AD conversion mode (second AD conversion mode).

It is known that a dark current is generated in an image sensor depending on the temperature at image capture time when exposure is performed for a long period of time or when image capturing is performed under a high temperature environment. The dark current is proportional to exposure time, and therefore its influence cannot be ignored under an imaging condition in which exposure is performed for a long period of time. In addition, the dark current has a high temperature dependence, and thus the output is approximately doubled when the temperature increases by 8 to 10° C. If AD conversion is performed in the first AD conversion mode under conditions in which there is a large amount of dark current, the amplitude increases due to the dark current in spite of the fact that the actual optical signal has a small amplitude, and low bit resolution AD conversion is performed. As a result, image quality is deteriorated.

To address this, in the present embodiment, the readout mode (AD conversion mode) for driving the image sensor is changed according to a set imaging condition. For example, if an imaging condition set by the operation circuit 109 is a long exposure with an exposure time of one minute or more, and the temperature at image capture time is a high temperature, in the second AD conversion mode, high resolution AD conversion is performed by using a single slope. Although a long readout time is required when AD conversion is performed in the second AD conversion mode, the need to perform readout at a high frame rate during a long time exposure is low, and thus this is suitable.

A condition for switching between the first AD conversion mode and the second AD conversion mode is determined as follows, for example. To be specific, the second AD conversion mode is selected in the case of a long time exposure that does not require a high frame rate, and the mode is switched to the first AD conversion mode in the case of a short time exposure. Also, the mode may be switched according to the amount of dark current. The amount of dark current generated in an image sensor can be determined in advance, and therefore a configuration is possible in which a table of the amount of dark current versus AD conversion mode switching conditions is stored in the image sensing device, and the AD conversion mode is switched according to the imaging condition.

Figure 7:
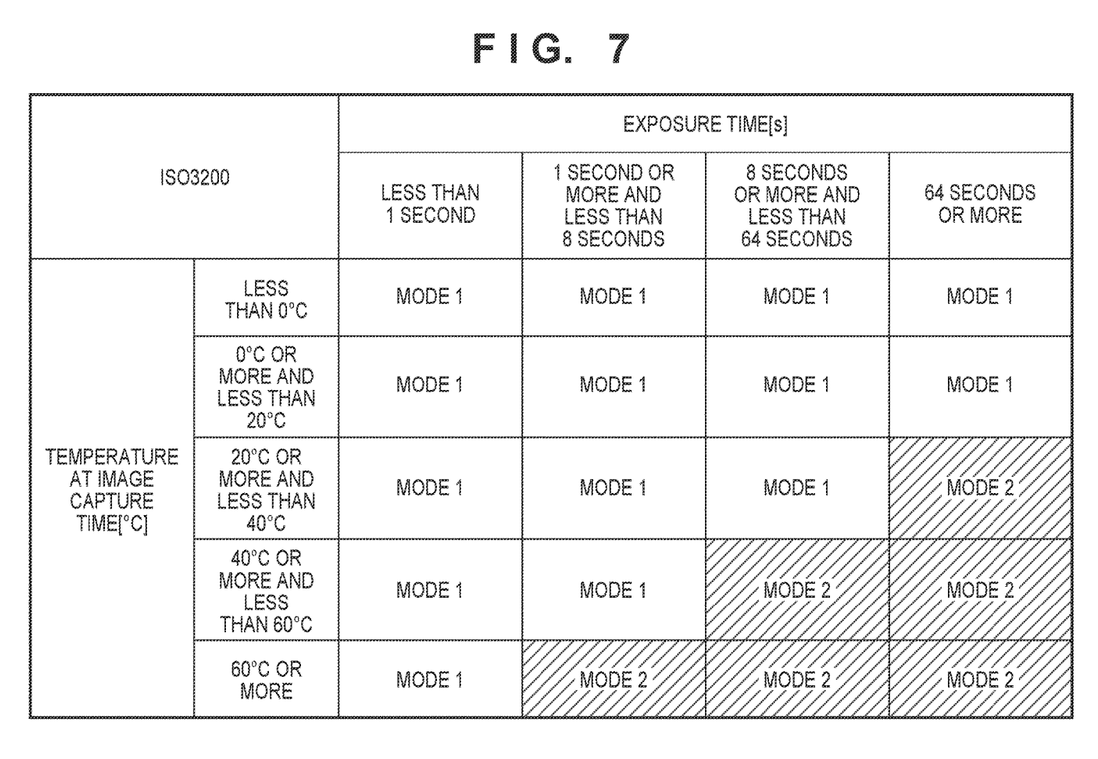
FIG. 7 is a diagram showing an example of conditions for switching between the first AD conversion mode and the second AD conversion mode.

FIG. 7 is a diagram showing an example of a table of conditions for switching between the first AD conversion mode (mode 1) and the second AD conversion mode (mode 2). FIG. 7 shows switching conditions in accordance with ISO 3200, and for example, if the exposure time is 30 seconds and the temperature at image capture time is 50° C., a determination is made to perform signal readout in mode 2. Signal readout (AD conversion) appropriate for the amount of dark current can be performed by preparing a table as shown in FIG. 7 for each imaging sensitivity. Then, by the digital output processing circuit 210 performing processing on the readout pixel signal such as subtracting a dark current component, an imaging signal can be obtained. In the imaging signal thus obtained, the low brightness output has been digitally converted with a high resolution, and thus an image having a high level of image quality can be obtained.

In the above description with reference to FIG. 6, the slope voltage VslopeL is selected as the fiducial voltage, but if the amount of dark current is very large, a slope voltage having a large inclination such as the slope voltage VslopeH may be selected as the fiducial voltage. If the amount of dark current is large, furthermore, digital conversion may be performed up to an output potential value having a large amplitude, and in this case, the time required for AD conversion may be shortened by increasing the inclination of the slope voltage according to readout time constraints. Noise increases as the amount of dark current increases, and thus the influence on image quality is small even when AD resolution is lowered. For this reason, it is possible to select such a slope voltage.

As described above, by switching the AD conversion method as appropriate according to the amount of dark current at image capture time, high speed readout can be achieved in the case where there is a small amount of dark current such as during a short time exposure, and also an image having a high level of image quality can be obtained even under an imaging condition in which there is a large amount of dark current.

Second Embodiment

Hereinafter, a second embodiment according to the present invention will be described. In the present embodiment, the selection of the multi-slope AD conversion mode (first AD conversion mode) or the single slope AD conversion mode (second AD conversion mode) is performed by evaluating the image quality at image capture time. The configuration of an image sensing device and the method for driving an image sensor are the same as those of the first embodiment, and thus a description thereof is omitted here.

Figure 8:
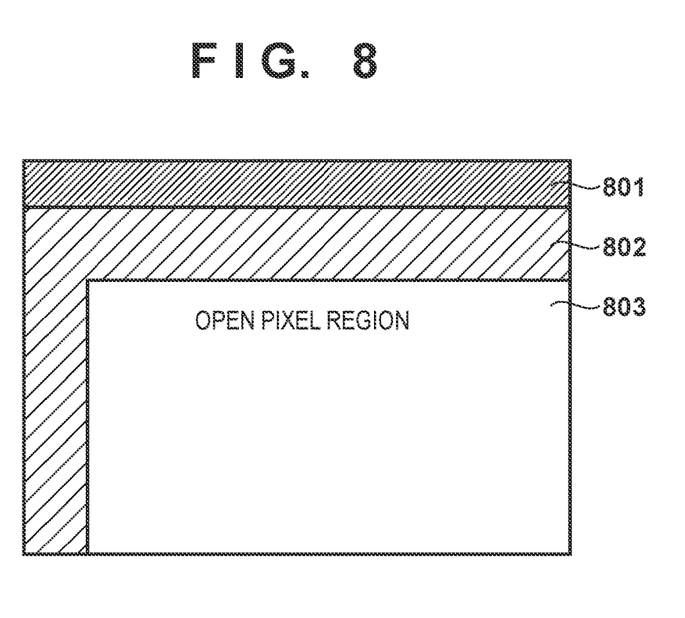
FIG. 8 is a diagram showing an example of a configuration of a pixel region in an image sensor according to a second embodiment.

FIG. 8 is a diagram showing an example of a configuration of a pixel region in the image sensor. The pixel region in the image sensor includes an open pixel region 803 having open pixels, and a first optical black region 801 and a second optical black region 802 that are light shield pixel regions. The first optical black region (hereinafter referred to as NULL) 801 is composed of pixels that do not include a PD, and the second optical black region (hereinafter referred to as OB) 802 is composed of pixels having a PD. The pixel output of the OB 802 contains a dark current component, and therefore can be used to calculate the amount of dark current at image capture time. The output of the NULL 801 that does not include PDs does not contain a dark current component, and thus serves as a black reference level. By subtracting the output of the NULL 801 from the output of the OB 802, the amount of dark current at image capture time can be acquired. The configuration of the pixel region shown in FIG. 8 is merely an example, and thus the NULL 801 and the OB 802 may be provided as separate regions on the same row.

A description will be given of a calculation method (detection method) for the amount of dark current in the case where an image sensor 103 having the pixel region as shown in FIG. 8 is used. At the time of readout of pixel outputs after completion of image capturing, the amount of dark current is measured by using several rows of the OB 802. For example, AD conversion is performed on several upper rows of the OB 802 in the second AD conversion mode. Then, an average value of the outputs is calculated by the digital output processing circuit 210, and the result is returned to the TG 208 so as to determine an AD conversion method to be used in the readout of the subsequent rows including the open pixel region 803. If the amount of dark current obtained by calculation is greater than a predetermined threshold value, control is performed so as to perform AD conversion in the second AD conversion mode, and if the amount of dark current is less than or equal to the predetermined threshold value, control is performed so as to perform AD conversion in the first AD conversion mode. The amount of dark current generated in an image sensor varies from image sensor to image sensor, and thus there are cases where the amount of dark current cannot be accurately reflected with the switch control according to the imaging condition, but by calculating the amount of dark current at image capture time, the AD conversion mode can be switched as appropriate.

In the operation of calculating the amount of dark current, it is sufficient if it is possible to determine whether or not the amount of dark current is greater than or equal to a threshold value, and thus a configuration is possible in which a threshold value voltage is input as the reference voltage VREF, a decision value J is obtained by performing operation until time t512 in the first AD conversion mode, and switching between the first AD conversion mode and the second AD conversion mode is performed according to the result.

Third Embodiment

Hereinafter, a third embodiment according to the present invention will be described. In the present embodiment, a method for performing high speed readout even in the single slope AD conversion mode (second AD conversion mode) will be described.

In the second embodiment, the method for calculating the amount of dark current by using the OB 802 was described. In present embodiment, in the case where AD conversion is performed in the single slope AD conversion mode that is the second AD conversion mode, the slope voltage is input by shifting a start voltage by an amount corresponding to the amount of dark current. The start voltage may be set to a voltage corresponding to the amount of dark current obtained by calculation, but because the imaging signal contains noise, the start voltage may be set to a voltage slightly higher than the voltage corresponding to the amount of dark current by taking into consideration the noise contained in the imaging signal. By shifting the start voltage as described above, the time required for AD conversion can be shortened. Also, as a result, it is also possible to configure the bit width of the count value without increasing by an amount corresponding to the amount of dark current.

Figure 9:
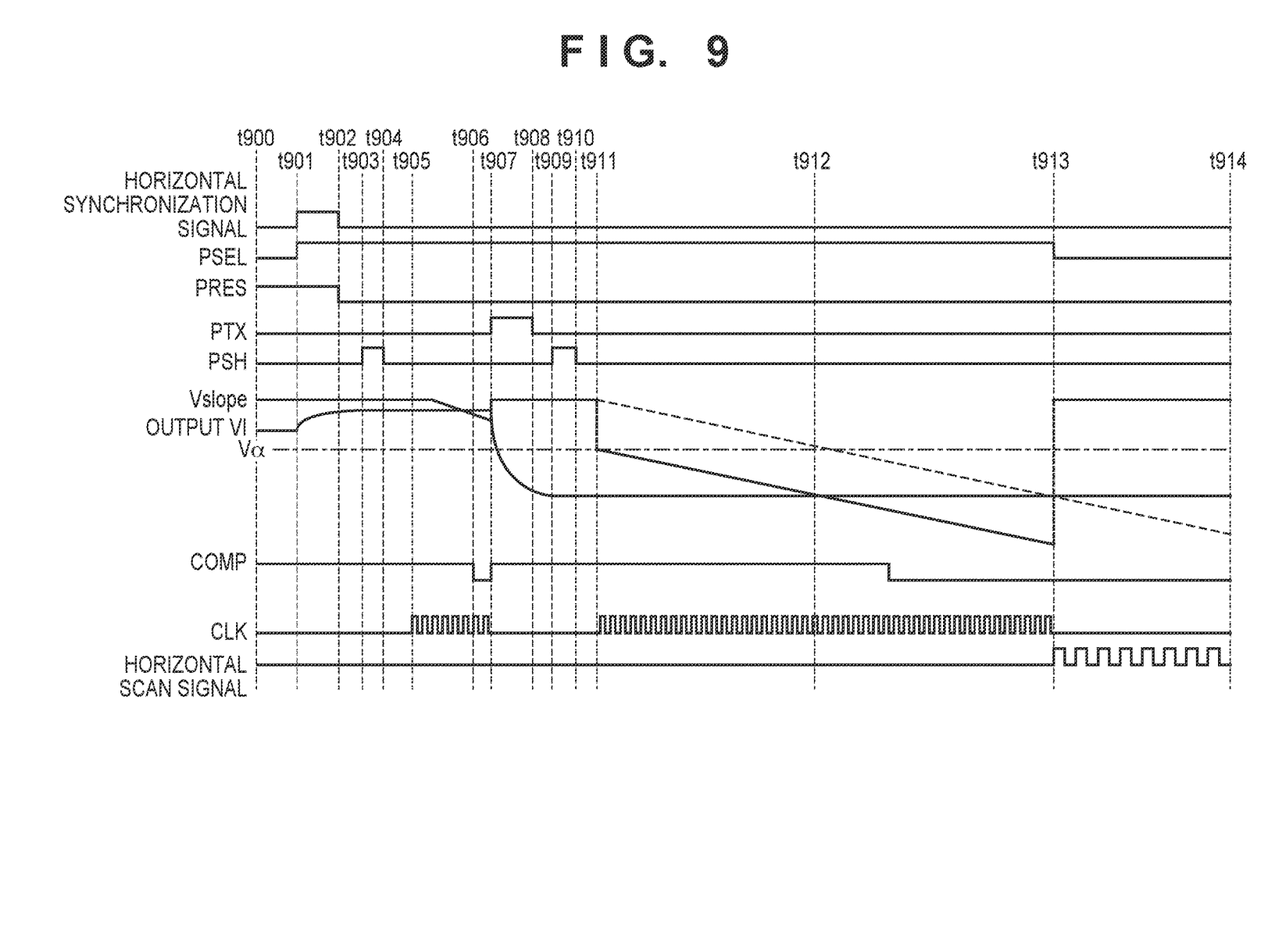
FIG. 9 is a timing chart showing an example of AD conversion operations according to a third embodiment.

FIG. 9 is a timing chart showing an example of an electric charge readout operation when the start voltage for the slope voltage is shifted in the single slope AD conversion mode.

The electric charge readout operation according to the present embodiment will be described with reference to FIG. 9. Operations performed from time t900 to time t910 are the same as those performed from time t600 to time t610 shown in FIG. 6, and thus a description thereof is omitted here.

At time t910, when the switch 402 is turned off, the slope voltage generation circuit 204 causes the slope voltage VslopeL (or VslopeH) to decrease from a start voltage $V\alpha$ along with time during a period from time t911 to time t913. The start voltage $V\alpha$ is a voltage value determined by taking into consideration the amount of dark current calculated through an operation of calculating the amount of dark current. In this mode, single slope AD conversion is performed, and thus the slope voltage generation circuit 204 generates only one type of slope voltage, and inputs the generated slope voltage into the column circuit 400. Here, it is assumed that the slope voltage VslopeL is input.

Simultaneously with the start of transition of the slope voltage VslopeL, a CLK is supplied to the counter 406. The value of the counter 406 increases according to the number of CLKs. Then when the slope voltage VslopeL input into the comparator 405 reaches the same level as the S signal, the output COMP of the comparator 405 is set to a low level (time t912), and at the same time, the operation of the counter 406 also stops. The count value obtained when the operation of the counter 406 stopped is a value corresponding to the AD converted S signal, and stored in the S memory 409 that is a memory for the S signal. For comparison, a dotted line indicates the slope voltage in the case where the voltage at which the slope voltage starts decreasing is not shifted by an amount corresponding to the start voltage $V\alpha$. It can be seen that in the case where the start point at which the voltage starts decreasing is shifted by an amount corresponding to the start voltage $V\alpha$, the S signal output V1 and the slope voltage reach the same level at a time earlier than in the case where the start point is not shifted.

Next, the signals stored in the N memory 408 and the S memory 409 are read out by the horizontal scan circuit 205. The column circuits 400 are sequentially operated from time t913, and the signals stored in the N memory 408 and the S memory 409 are thereby transmitted to the digital output processing circuit 210 via the horizontal output lines 411 and 412. Then, after processing of calculating a differential signal level (optical component) by subtracting the N signal from the S signal has been performed, the signals are output to the outside of the image sensor 103. The count value obtained by shifting the start point at which the voltage starts decreasing by an amount corresponding to the start voltage $V\alpha$ may be added by the digital output processing circuit 210 and then output.

An example of a method for calculating the start voltage $V\alpha$ will now be described. In an image sensor 103 having the pixel region as shown in FIG. 8, an output average value OBave of several rows in the OB 802 is calculated by the digital output processing circuit 210. The result of calculation is input into the TG 208, and AD conversion is performed in the second AD conversion mode if the result of calculation is greater than a predetermined threshold value. Then, the start voltage $V\alpha$ for the fiducial voltage is determined, and the signal is transmitted to the slope voltage generation circuit 204. The start voltage $V\alpha$ may be a voltage value corresponding to the value calculated from the output of the OB 802, but is desirably shifted taking into consideration the amount of noise in the imaging signal. The amount of shift may be determined based on, for example, the following expression: $OBave - 3 \times OB\sigma$ by calculating the amount of variation $OB\sigma$ in the output of the OB 802. It is also possible to determine the amount of shift based on a table of the start voltage Vα corresponding to the value of OBave that is a digital output.

Also, the count value corresponding to the start voltage Vα may be added to the signal of a pixel whose count value is AD converted according to the value of the start voltage by preparing in advance a correspondence table between voltage value and count value. Also, the count value corresponding to the start voltage Vα may be obtained by, prior to the signal readout, inputting the same voltage as the voltage Vα into the column output line 201, and performing AD conversion in the second AD conversion mode.

As described above, by changing the start voltage for the slope voltage according to the amount of dark current at image capture time, even under an imaging condition in which there is a large amount of dark current, it is possible to obtain an image having a high level of image quality while suppressing an increase in readout time.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-142725, filed Jul. 20, 2016 which is hereby incorporated by reference herein in its entirety.

What is claimed is:

1. An image sensing device comprising:
   a plurality of pixels; and
   an AD converter that compares a pixel signal output from the plurality of pixels with a slope voltage having a temporally variable potential so as to perform AD conversion on the pixel signal,
   wherein switching is performed between a first mode and a second mode according to amount of dark current generated in the pixels in a same imaging sensitivity, the first mode being a mode in which the pixel signal is AD converted by selecting one from among a plurality of slope voltages and comparing the pixel signal with the selected slope voltage, and
   the second mode being a mode in which the pixel signal is AD converted by comparing the pixel signal with a predetermined slope voltage.

2. The image sensing device according to claim 1, wherein the plurality of pixels include a plurality of light shielded pixels, and
   the amount of dark current is detected by using an output of the light shielded pixels.

3. The image sensing device according to claim 2, wherein the plurality of light shielded pixels include a pixel having a photoelectric conversion portion and a pixel that does not have a photoelectric conversion portion, and
   the amount of dark current is detected by subtracting an output of the pixel that does not have a photoelectric conversion portion from an output of the pixel having a photoelectric conversion portion.

4. The image sensing device according to claim 1, wherein the AD converter compares the amount of dark current with a predetermined threshold value, and performs switching between the first mode and the second mode based on a result of comparison.

5. The image sensing device according to claim 4, wherein the AD converter perforins switching to the second mode when the amount of dark current is greater than the predetermined threshold value, acid performs switching to the first mode when the amount of dark current is less than or equal to the predetermined threshold value.

6. The imaging sensing device according to claim 1, wherein in the second mode, the AD converter changes a temporally variable inclination of the slope voltage according to the amount of dark current.

7. The image sensing device according to claim 1 wherein in the second mode, the AD converter changes a start voltage at which the slope voltage starts varying according to the amount of dark current.

8. The image sing device according to claim 1, further comprising
   a storage unit that stores a relationship between the amount of dark current and selection of either of the first mode and the second mode under the amount of dark current,
   wherein the AD converter performs switching between the first mode and the second mode based on the relationship.

9. The image sensing device according to claim
   wherein in the first mode, the AD converter performs the AD conversion of the pixel signal by using one of the plurality of slope voltages that has a relatively large temporally variable potential inclination when a level of the pixel signal is greater than a predetermined reference value, and performs the AD conversion of the pixel signal by using one of the plurality of slope voltages that has a relatively small temporally variable potential inclination when the level of the pixel signal is less than or equal to the predetermined reference value.

10. The image sensing device according to claim 1, wherein the AD converter performs AD conversion on a signal obtained by resetting the pixels by using one of the plurality of slope voltages that has a small temporally variable potential inclination.

11. The image sensing device according to claim 1, wherein each of the plurality of pixels includes:
a photoelectric conversion portion that generates electric charges according to incident light.
a floating diffusion portion;
a transfer switch that transfers t e electric charges generated by the photoelectric conversion portion to the floating diffusion portion; and
a source follower amplifier that amplifies a voltage corresponding to the electric charges transferred to the floating diffusion portion and outputs the amplified voltage.

12. A method for controlling an image sensing device including a plurality of pixels, the method comprising:
comparing a pixel signal output from frown the plurality of pixels with a slope voltage having a temporally variable potential so as to perform AD conversion on the pixel signal,
wherein in the AD conversion step, switching is performed between a first mode and a second mode according to an amount of dark current generated in the pixels in a same imaging sensitivity,
the first mode being a mode in which the pixel signal is AD converted by selecting one from among a plurality of slope voltages and comparing the pixel signal with the selected slope voltage, and
the second mode being a mode in which the pixel signal is AD converted by comparing the pixel signal with a predetermined slope voltage.

* * * * *